United States Patent
Schmidt et al.

(10) Patent No.: US 6,422,362 B1
(45) Date of Patent: Jul. 23, 2002

(54) BRAKE DEVICE

(75) Inventors: Frank Schmidt, Schweinfurt; Thomas Huber, Schwebheim; Egon Schäflein, Schweinfurt; Johannes Rau, Gerstetten, all of (DE)

(73) Assignee: SRAM Deutschland GmbH, Schweinfurt (DE)

( * ) Notice: Subject to any disclaimer, the term of this patent is extended or adjusted under 35 U.S.C. 154(b) by 0 days.

(21) Appl. No.: 09/598,353

(22) Filed: Jun. 21, 2000

(30) Foreign Application Priority Data

Jun. 21, 1999 (DE) .......................... 199 28 334
Jun. 7, 2000 (DE) .......................... 100 28 283

(51) Int. Cl.⁷ .............................................. F16D 51/00
(52) U.S. Cl. .................... 188/339; 188/336; 188/259; 192/78
(58) Field of Search ................. 188/336, 337, 188/338, 339, 340, 341, 342, 343, 249, 204 R, 217, 259, 24.11, 330; 192/77, 78

(56) References Cited

U.S. PATENT DOCUMENTS

| | | | | | |
|---|---|---|---|---|---|
| 1,162,048 A | * | 11/1915 | Freeman | .................... | 188/339 |
| 1,273,941 A | * | 7/1918 | Smith | .................... | 188/336 |
| 1,285,214 A | * | 11/1918 | Kelley | .................... | 188/336 |
| 1,320,680 A | * | 5/1919 | Lee et al. | .................... | 188/339 |
| 1,652,479 A | * | 12/1927 | Huck et al. | .................... | 188/336 |
| 1,737,025 A | * | 11/1929 | Sanford | .................... | 188/336 |
| 1,774,565 A | * | 9/1930 | Price | .................... | 188/336 |
| 1,824,510 A | * | 9/1931 | Sneed | .................... | 188/339 |
| 1,876,177 A | * | 9/1932 | Taylor | .................... | 188/339 |
| 1,928,060 A | * | 9/1933 | Brie | .................... | 188/339 |
| 1,928,081 A | * | 9/1933 | Buskirk | .................... | 188/336 |
| 1,930,779 A | * | 10/1933 | Snell | .................... | 188/339 |
| 1,940,470 A | * | 12/1933 | Taylor | .................... | 188/336 |
| 1,994,813 A | * | 3/1935 | Dodge | .................... | 188/336 |
| 2,001,938 A | * | 5/1935 | Parker | .................... | 188/339 |
| 2,022,032 A | * | 11/1935 | Fowler | .................... | 188/339 |
| 2,167,935 A | * | 8/1939 | Borden | .................... | 188/336 |
| 2,330,879 A | * | 10/1943 | Forbes | .................... | 188/339 |
| 4,981,200 A | * | 1/1991 | Gee | .................... | 188/341 |
| 5,499,699 A | * | 3/1996 | Chen | .................... | 188/24.21 |

* cited by examiner

Primary Examiner—Paul N. Dickson
Assistant Examiner—Benjamin A Pezzlo
(74) Attorney, Agent, or Firm—Cohen, Pontani, Lieberman & Pavane

(57) ABSTRACT

Disclosed is a brake device for at least one axle of a wheel of a vehicle such as a bicycle for braking a brake drum which is connected to the wheel, having a brake carrier, a shoe element, a brake lever with a cam which is arranged between two shoe ends of the shoe element and is preloaded in that area. The shoe element is connected to the brake carrier by a holder and the cam is connected to the brake lever without a bearing, by means of which it can be pivoted. The brake device according to the present invention has the advantage that it can be produced mechanically in large numbers in a simple manner, its characteristics can be influenced by design measures, and it has a high level of efficiency, so that reduced actuating forces result and possibly simplified actuating elements may be used.

24 Claims, 2 Drawing Sheets

A-A

BRAKE DEVICE

BACKGROUND OF THE INVENTION

1. Field of the Invention

The invention relates to a brake device for at least one axle of a wheel of a vehicle.

2. Description of the Related Art

German patent 1,069,019 discloses an actuating device for a mechanically actuated inside shoe brake for vehicle hubs, showing the conventional principle of a brake shoe arrangement which can be used for brakes for lightweight vehicles. The two brake shoes widen against a spring force by means of a rotatable cam and rotate about a rotation point in such a manner that the brake shoes come to bear against the brake drum. Since the leading brake shoe has a higher braking action than the trailing brake shoe, the wear to this brake is greater, and consequently, after a period of use, the lining heights on the two brake shoes differ, causing distortion to the cam which is actuated by the brake lever. Since the rotation point between the brake shoes and the cam in each case has a rotation point fixed on a brake plate, it is not possible to form a balance between the two brake shoes with respect to the pressure which they exert on the brake drum. As the wear increases, the brake will lose braking force, since the trailing brake shoe will increasingly have to provide the braking force.

The above-described drawback relating to the balancing of the brake shoes in terms of their contact with the brake drum is avoided by a multishoe brake, as described in German Patent No. 949 329, which is preferably designed as a two-shoe inside brake, in particular for motor vehicles. The multishoe brake has a centering device for the brake shoes in the at-rest position. The brake shoe ends face one another and are separated by a spreading member. The shoe ends are connected to one another by a restoring spring which acts as a centering device and is supported approximately in the center, radially with respect to the drum, on a fixed frictional body. The spreading member is connected to a brake shaft on which a brake lever for actuating the multishoe brake is arranged, via a dovetail-like guide, acting displaceably in the direction of force of the two brake shoes. The rotary movement of the brake shaft is transmitted to the spreading element via the dovetail, and the braking action, due to the contact of the brake shoes with a brake drum, can take place without obstruction and, in particular, always with the same contact force. As the wear increases, the leading brake shoe, with its greater wear, can in this way be adjusted to a greater extent than the trailing brake shoe, which exhibits a lower level of wear. Therefore, the braking action will not change compared to the above-described brake in accordance with German patent 1,069,019.

SUMMARY OF THE INVENTION

The brake device of the invention, which is also suitable for braking a brake drum which is connected to a wheel of a bicycle, represents an advanced development over the prior art, in which in particular the simplifications to the designs of the brake shoes and the design of the cam in conjunction with a brake lever contribute to producing a brake device which is inexpensive.

The brake device has a shoe element which is connected to a holder, it being possible to connect the holder to a brake carrier in such a manner that the shoe element is simultaneously centered on the brake carrier. The shoe element is of similar design to an inside band brake and preferably has a brake lining over its entire periphery. The holder is connected to the shoe element at a connecting point in such a manner that the shoe element has two free shoe halves which, on both sides of the connecting point, have areas about which the shoe halves can spring. The shoe halves may be fitted with reinforcements which ensure that the shoe halves bear against the brake drum in a dimensionally accurate manner. The shoe halves are preloaded with respect to a cam which is directly connected to a brake lever, so that the cam is clamped in between the ends of the shoe halves. Moreover, the ends of the shoe halves are designed in such a manner that the cam is clamped in a contour which provides it with a very specific position in the load-free state. As indicated above, the cam is directly connected to the brake lever and is not mounted in the brake carrier. When the brake lever is actuated, the cam is rotated and the shoe halves are pressed outward against the brake drum, the pressure for the respective shoe, due to the self-centering action of the cam, remaining constant both when the linings are new and after they have been used for a period, involving wear to the linings.

It is also possible to divide the surrounding lining into two lining halves, so that there is a slight saving on material, although this may be of no consequence when fitting the brake with centering of the shoe element. When the shoe element is being fitted on the brake carrier, it is necessary to fit the shoe element in combination with the brake lever, since the brake carrier has an extension which fixes the brake lever in its installed position so that it cannot fall out during use. The extension may be designed in such a way that there is no possibility of removing the brake lever. If the holder is screwed to the brake lever, the shoe element can be removed from the brake carrier with the brake lever and disassembled into its individual parts.

The brake device is designed for inexpensive production. Accordingly, the shoe element may be produced from a deep-drawn piece of sheet metal, the holder being an integral component of this deep-drawn part. The bottom of a deep-drawn cup is stamped out in such a manner that the reinforcements of the shoe halves and the holder with its centering and attachment options are maintained, and both the connecting point and the areas for spring preloading of the shoe halves can be formed. The contact points between the shoe halves and the cam, which are situated approximately opposite the connecting point, are likewise formed by the stamping operation, during which it may be necessary to part the edge at the outer periphery separately, the width of the gap provided for the parting being dependent on the preloading required for the shoe halves.

As an alternative to the above-mentioned brake device made from a deep-drawn piece of sheet metal, the brake device can be made from lightweight metal and is produced as a solid part in which the reinforcements on the shoe halves may be designed with a moment of resistance which satisfies the particular requirements imposed on the braking operation executed by the individual shoe halves. In this way, the trailing shoe half can act with a higher pressure and the leading shoe half with a lower pressure during the braking operation. Since under certain environmental conditions, particularly when wet, drum brakes react more sharply than when it is dry, the moment of resistance can be designed in such a way that a self-energizing effect all the way through to self-locking cannot occur even under adverse environmental conditions.

Since it is necessary for the shoe element to be accurately centered with the brake drum, the holder may have a centering hole which is centered on an axle of the hub of the wheel. A second possibility is for the centering means with respect to the hub axle to be contained in the brake carrier, in which case it is merely necessary to fix the shoe element in an accurate position on the brake carrier. Such fixing may be effected via the holes for attaching the holder to the brake carrier.

Therefore, it is an object of the invention to provide a brake element which can be produced at low cost while dispensing in particular with pivotable bearings for the shoe element and the brake lever.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

Two exemplary embodiments of a brake device are explained in five drawings, in which.

DETAILED DESCRIPTION OF THE PRESENTLY PREFERRED EMBODIMENTS

Figure 1:
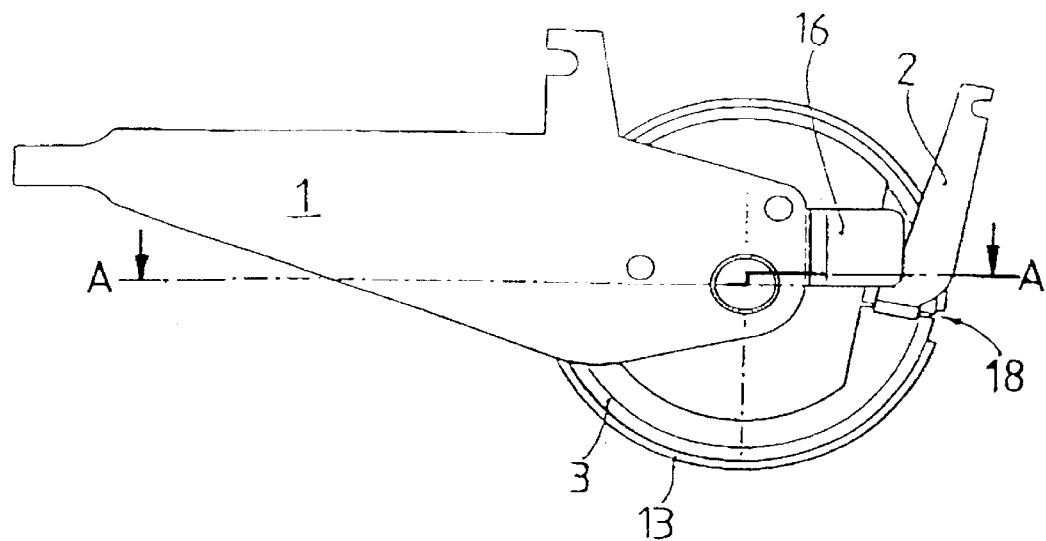
FIG. 1 shows a brake carrier with a brake lever and a shoe element with a surrounding lining.
Figure 2:
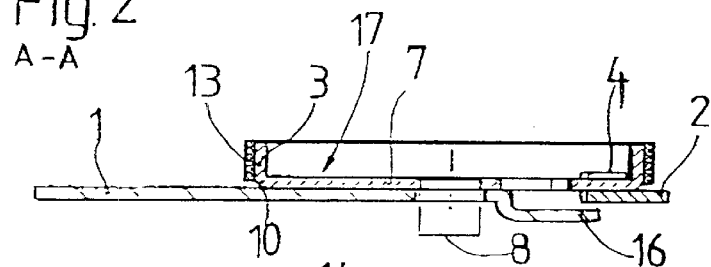
FIG. 2 shows the shoe element with a holder which is connected to the shoe element at a connecting point and is part of a deep-drawn cup, from which the shoe element and the holder can be produced.
Figure 3:
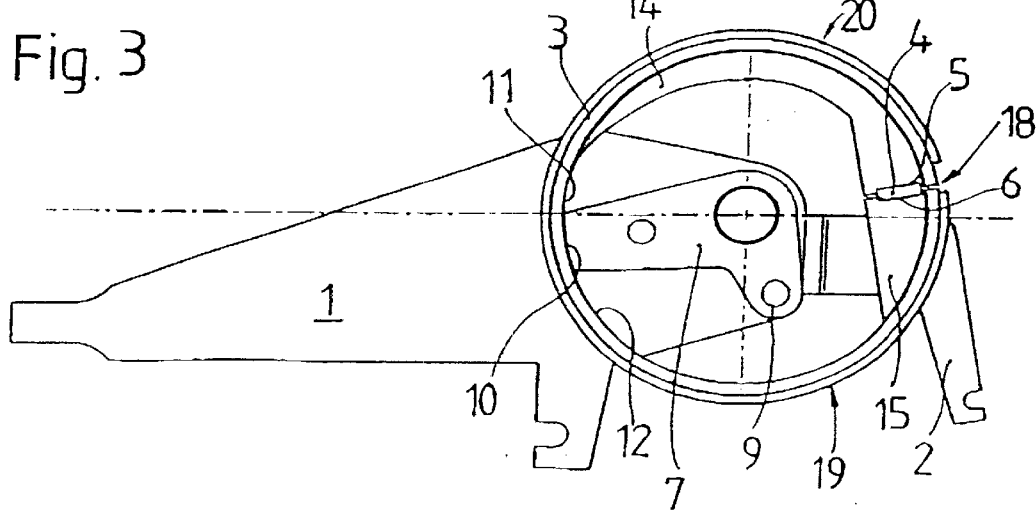
FIG. 3 shows the shoe element with the holder on the brake carrier in the centered position with the brake lever and a cam which is arranged in the shoe element under preloading.

Referring to FIGS. 1 to 3, a brake carrier 1 for a brake device for bicycles, is connected to a shoe element 3 with a brake lever 2. The shoe element 3 is connected to the brake carrier 1 via a holder 7 which has a centering hole 8, by means of which the shoe element 3 is centered on an axle of a wheel of the bicycle. The holder 7 and the brake carrier 1 have holes 9, via which the two parts can be connected to one another. The holder 7 is connected to the shoe element 3 at a connecting point 10, resulting in a first shoe half 19 and a second shoe half 20, which can vibrate in a spring-loaded manner about areas 11 and 12 on both sides of the connecting point 10. The first shoe half 19 has a shoe end 6, and the second shoe half 20 has a shoe end 5, between which there is arranged a cam 4 which is connected to the brake lever 2. Via the areas 11 and 12, the shoe ends 5 and 6 are preloaded, so that the cam 4 is clamped in between the shoe ends 5 and 6 and is preloaded even in the at-rest position of the brake lever 2. The shape of the shoe ends 5 and 6 is such that they surround the cam 4 and do not allow it to move in the plane of the brake carrier 1. If the holder 7 is mounted on the brake carrier 1, a projection 16 on the brake carrier 1 ensures that it is also impossible for the brake lever 2 and the cam 4 to move in a direction perpendicular to the plane of the brake carrier 1.

The shoe element 3 is surrounded by a lining 13 which can be brought into frictional engagement with a brake drum on the wheel of the bicycle by turning the cam 4 using the brake lever 2. As illustrated in FIG. 2, the holder 7 and the shoe element 3 are in the form of a cup 17 which may be deep-drawn, in which case a subsequent operation can be used to form the holder 7 and a reinforcement 14 on the second shoe half 20 and a reinforcement 15 on the first shoe half 19. In the operation described above, it is also possible to form the contours of the shoe ends 5 and 6, the shoe element 3 having a gap 18 on the outer diameter, the width of which gap must be such that there is both sufficient clearance between the lining 13 and the brake drum and sufficient preloading between the shoe ends 5 and 6 on the cam 4.

Figure 4:
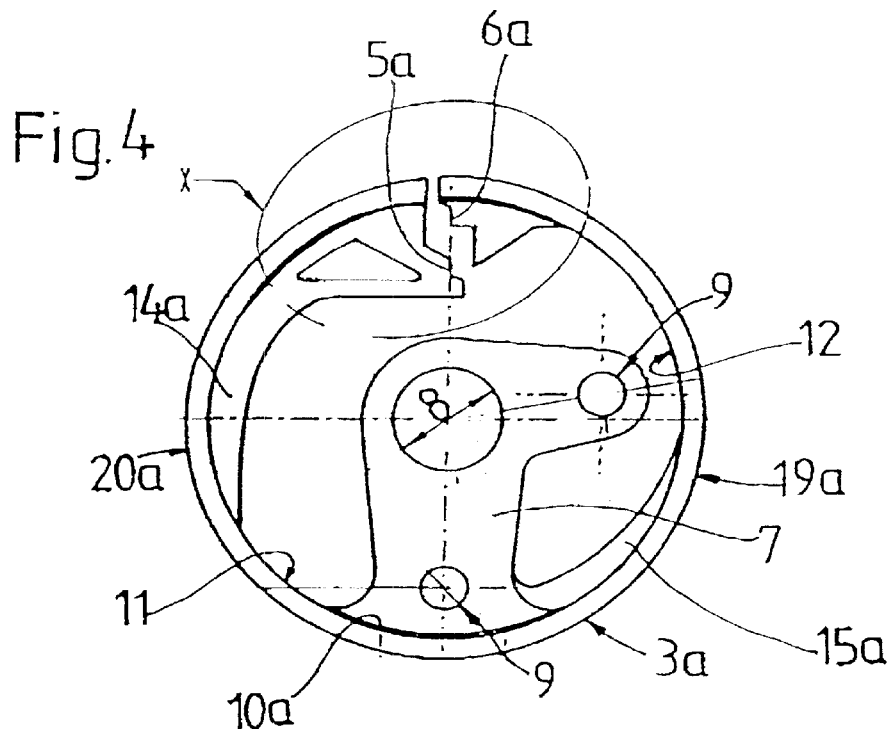
FIG. 4 shows a further exemplary embodiment of a shoe element with a holder.
Figure 5:
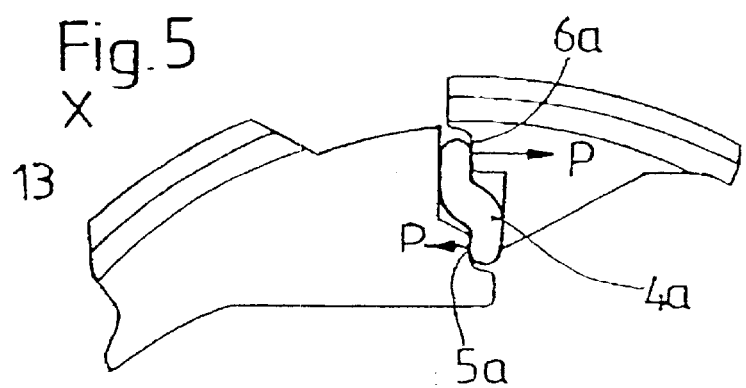
FIG. 5 shows the shoe element shown in FIG. 4 with a cam, the specific shape of which control the direction of the forces in the shoe element.

FIGS. 4 and 5 show a shoe element 3a which has a first shoe half 19a and a second shoe half 20a, which are connected to the holder 7 via a connecting point 10a, the shoe halves 19a and 20a each having areas 11 and 12 which are in the vicinity of the connecting point 10a and allow the shoe halves 19a and 20a to spring. The first shoe half 19a has a reinforcement 15a at one shoe end 6a, and the second shoe half 20a has a reinforcement 14a at one shoe end 5a. The shoe ends 5a and 6a each form a contour for an S-shaped cam 4a which is under preloading from the two shoe halves 19a and 20a and, because of the contour at the shoe ends 5a and 6a, in its at-rest position cannot move out of its position in the plane of the brake carrier 1. The S shape is selected for the reason that, when the cam 4a pivots, a force P, the direction of which approximately coincides with the direction of movement of the shoe ends 5a and 6a, is generated on each of the shoe ends 5a and 6a. The direction of movement which is generated in this way at least when the brake device is new, at the contact points between the cam 4a and the shoe ends 5a and 6a, ensures that a minimum of friction is developed and the force which is introduced into the brake device via the brake lever 2 can be transmitted to the shoe element 3 with a high level of efficiency.

Figure 6:
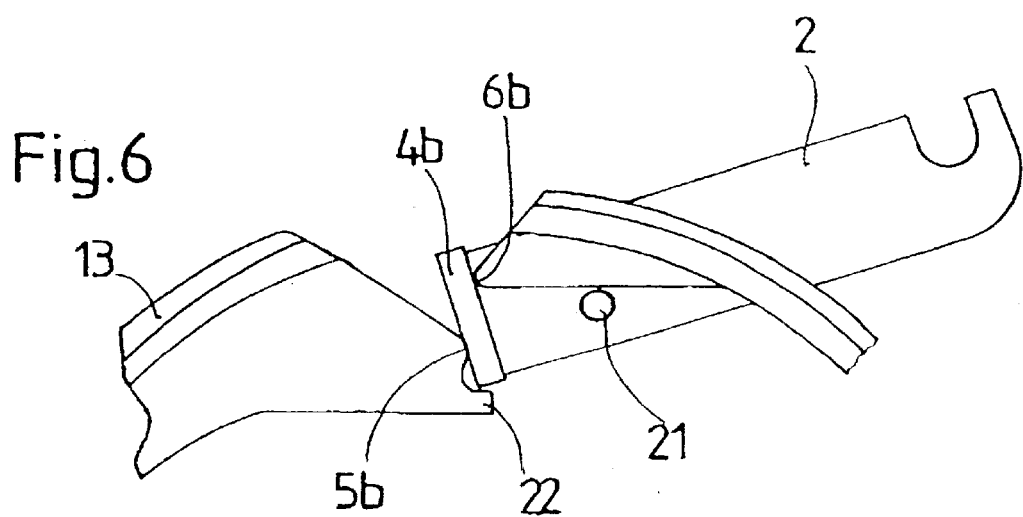
FIG. 6 shows the shoe element shown in FIG. 5 with a brake lever which fixes its position by means of a stop and by means of a lug on the shoe element.

FIG. 6 shows a brake lever 2 which is connected to a cam 4b and has a stop 21 which interacts with a shoe end 6b in order to fix the brake lever 2 in its at-rest position. At its contact point with the cam 4b, an opposite shoe half 5b is designed as a rounded section and is preloaded against the shoe half 6b, so that the brake lever 2 rotates in a counter-clockwise direction and moves its stop 21 onto the shoe half 6b. To prevent the cam 4b from slipping out of its position between the shoe halves 5b and 6b, a lug 22 is arranged on the shoe half 5b, preventing the cam from being able to slip through radially inward in the brake device. The rounded sections of the shoe ends 5b and 6b are designed in such a manner that, when the brake lever 2 moves, a rolling movement is generated with respect to the cam 4b, taking place virtually without friction, so that the brake device can be controlled very sensitively in this way.

FIGS. 4 to 6 show a brake device made from a solid part which preferably consists of aluminum. The shoe halves 19a and 20a are once again preloaded against one another, in order to place the cam 4a or 4b in the prescribed position. In this way, the reinforcements 14a and 15a may be of any desired width up to the width of the brake lining 13, making it possible to produce moments of resistance which prevent self-locking of the brake device under adverse weather conditions.

As shown in FIGS. 3 and 4, the connecting point 10, 10a divides the shoe element 3, 3a into shoe halves 19, 19a and 20, 20a of virtually equal length. Depending on the particular application of the proposed brake device, these halves may also be designed with higher or lower braking actions, which is made possible by lengthening or shortening the leading, first shoe half 19, 19a. If this half is lengthened, the braking action increases for a constant actuating force introduced via the cam 4, 4a. The connecting point 10, 10a can be shifted as desired with respect to the position of the cam 4, 4a, meaning that the principle of a brake device according to the present invention is suitable for a large number of different application areas.

The brake device according to the present invention has the advantage that it can be produced mechanically in large numbers in a simple manner and has a high level of efficiency, so that reduced actuating forces result, and possibly simplified actuating elements can be used.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

We claim:

1. A brake device for at least one axle of a wheel of a vehicle for braking a brake drum which is connected to the wheel, comprising:
   a brake carrier;
   at least one shoe element having shoe ends, the least one shoe element having a holder which is connected to the brake carrier; and
   a brake lever not connected to the brake carrier, the brake lever having at least one cam, the at least one shoe element configured to resiliently bias the shoe ends against the cam.

2. The brake of claim 1, wherein the holder is centered on the brake carrier by a centering hole coaxial with the axle of the wheel.

3. The brake device of claim 1, wherein the holder has holes by which it is connected to the brake carrier and centered.

4. The brake device of claim 1, wherein the holder is connected to the least one shoe element at a connecting point which divides the shoe element into two shoe halves which are spring-loaded freely around the connecting point.

5. The brake device of claim 1, wherein the shoe element is spring-preloaded with respect to the cam.

6. The brake device of claim 1, wherein the shoe end of the first shoe half is spring-preloaded against the cam and the shoe end of the second shoe half is likewise spring-preloaded against the cam in the at-rest position thereof.

7. The brake device of claim 4, wherein the least one shoe element, on both sides of the connecting point of the holder, has areas against which the shoe halves can spring.

8. The brake device of claim 7, wherein the wall thickness of the shoe element in the areas is of variable design, so that the circular shape of the shoe element is approximately maintained when it spreads open during braking.

9. The brake device of claim 4, wherein the least one shoe element has reinforcements on a leading shoe, which contribute to the pressures on the least one shoe element being balanced as far as possible, taking into account the self-energizing action of the leading shoe when they spread open into the brake drum situated outside the least one shoe element, on both sides of the connecting point when they spread open in the braking position.

10. The brake device of claim 9, wherein the reinforcement along a leading part of the least one shoe element has a moment of resistance which, during braking, limits the result self-energizing action to a level which is below that of self-locking.

11. The brake device of claim 10, wherein the least one shoe element and the holder form a deep-drawn cup, and the contours of the holder and the reinforcements are formed by stamping.

12. A brake device for at least one axle of a wheel of a vehicle for braking a brake drum which is connected to the wheel, comprising:
   a brake carrier;
   at least one shoe element having shoe ends;
   a brake lever not connected to the brake carrier, the brake lever having at least one cam, the at least one shoe element configured to resiliently bias the shoe ends against the cam, the cam forming the bearing for the brake lever in the brake device.

13. The brake device of claim 12, wherein each of the shoe ends surrounds the cam and thus bears the brake lever in each of its possible angular positions.

14. The brake device of claim 12, wherein the cam has an S-shaped profile which, when the cam begins to rotate, generates a force in the direction of movement of the shoe ends.

15. A brake device for at least one axle of a wheel of a vehicle for braking a brake drum which is connected to the wheel, comprising:
   a brake carrier;
   at least one shoe element having shoe ends;
   a brake lever with at least one cam which is arranged between the two shoe ends, wherein the cam is unambiguously positioned both by the preloaded shoe ends and by a stop on the brake lever and by a lug on at least one of the shoe ends and forms the bearing for the brake lever in the brake device.

16. The brake device of claim 1, wherein the least one shoe element is made from a lightweight metal.

17. The brake device of claim 15, wherein the least one shoe element and the carrier form a solid part.

18. The brake device of claim 15, wherein the cam has a plane surface and at least one of the shoe ends has a rounded section which, during braking, rolls along the plane surface of the cam.

19. The brake device of claim 1, wherein the brake lever is held in position between an outer contour of the brake device and a projection and is secured in such a way that it cannot fall out in the direction of the axle of the wheel.

20. The brake device of claim 1, wherein the vehicle is a bicycle.

21. The brake device of claim 1 wherein the vehicle is a vehicle for a disabled person.

22. The brake device of claim 1 wherein the vehicle is a wheel chair.

23. A brake device for at least one axle of a wheel of a vehicle for braking a brake drum which is connected to the wheel, comprising:
   a brake carrier;
   a brake drum;

at least one shoe element having shoe ends, the least one shoe element having a holder which is connected to the brake carrier;

a brake lever not connected to the brake carrier, the brake lever having at least one cam, the at least one shoe element configured to resiliently bias the shoe ends against the cam;

a lining surrounding said least one shoe element and adapted for frictional engagement of said brake drum by manipulation of said brake lever.

24. The brake device of claim 23 wherein the least one shoe element comprises at least two shoe elements.

* * * * *